(12) United States Patent
West et al.

(10) Patent No.: US 10,141,733 B2
(45) Date of Patent: Nov. 27, 2018

(54) VARIABLE FREQUENCY DRIVE OVERVOLTAGE PROTECTION

(71) Applicant: TRANE INTERNATIONAL INC., Piscataway, NJ (US)

(72) Inventors: Nathan Thomas West, Holmen, WI (US); David Marshall Foye, Pasadena, CA (US); Korwin Jay Anderson, Pasadena, CA (US)

(73) Assignee: Trane International Inc., Piscataway, NJ (US)

( * ) Notice: Subject to any disclaimer, the term of this patent is extended or adjusted under 35 U.S.C. 154(b) by 77 days.

(21) Appl. No.: 14/795,487

(22) Filed: Jul. 9, 2015

(65) Prior Publication Data

US 2015/0311695 A1 Oct. 29, 2015

Related U.S. Application Data

(63) Continuation of application No. PCT/US2014/011591, filed on Jan. 15, 2014.
(Continued)

(51) Int. Cl.
*H02H 9/04* (2006.01)
*H02H 3/20* (2006.01)
(Continued)

(52) U.S. Cl.
CPC ............ *H02H 3/20* (2013.01); *H02H 7/1225* (2013.01); *H02M 5/458* (2013.01); *H02P 27/06* (2013.01); *H02H 6/00* (2013.01); *H02H 9/041* (2013.01)

(58) Field of Classification Search
CPC ............ H02H 9/04; H02H 9/043; H02H 7/26; H02M 5/458
See application file for complete search history.

(56) References Cited

U.S. PATENT DOCUMENTS 2,486,513 A 11/1949 Ridgley
4,084,406 A 4/1978 Brenneman
(Continued)

FOREIGN PATENT DOCUMENTS

JP 06105456 4/1994
JP 08079963 3/1996
(Continued)

OTHER PUBLICATIONS

International Search Report and Written Opinion, PCT/US2014/11591, dated Jul. 14, 2014, 11 pgs.

*Primary Examiner* — Rina Duda
(74) *Attorney, Agent, or Firm* — Taft Stettinius & Hollister LLP (57) ABSTRACT

Overvoltage protection apparatuses, systems and methods for variable frequency motor drives are disclosed. In an exemplary embodiment, a variable frequency motor drive system including a rectifier, a DC bus electrically coupled with the rectifier, and an inverter electrically coupled with the DC bus is provided. A protection device electrically coupled with the rectifier and configured to interrupt power supply to the system based upon fault conditions is provided. A controller is provided and configured to receive information indicative of a voltage of the DC bus, process the received information to model a condition of at least one component of the variable frequency motor drive, and control the protection device to interrupt power supply to the variable frequency motor drive if the modeled condition meets a fault criterion.

22 Claims, 5 Drawing Sheets

Related U.S. Application Data (60) Provisional application No. 61/753,471, filed on Jan. 17, 2013.

(51) Int. Cl.
*H02P 27/06* (2006.01)
*H02M 5/458* (2006.01)
*H02H 7/122* (2006.01)
*H02H 6/00* (2006.01)

(56) References Cited

U.S. PATENT DOCUMENTS

| | | | | |
|---|---|---|---|---|
| 4,308,491 | A * | 12/1981 | Joyner, Jr. | H02H 7/0833 318/732 |
| 4,843,533 | A * | 6/1989 | Roof | H02H 7/1216 361/111 |
| 5,070,290 | A | 12/1991 | Iwasa et al. | |
| 5,079,515 | A | 1/1992 | Tanimoto | |
| 5,157,574 | A * | 10/1992 | Tuusa | H02M 5/4585 361/18 |
| 5,170,310 | A * | 12/1992 | Studtmann | H02H 7/30 361/65 |
| 5,465,202 | A * | 11/1995 | Ibori | H02H 3/247 363/34 |
| 5,570,258 | A * | 10/1996 | Manning | H02H 3/253 361/76 |
| 5,590,179 | A | 12/1996 | Shincovich et al. | |
| 5,646,810 | A * | 7/1997 | Funke | H02H 9/04 361/111 |
| 5,734,256 | A * | 3/1998 | Larsen | H02H 3/023 323/207 |
| 5,886,860 | A | 3/1999 | Chen et al. | |
| 6,094,129 | A | 7/2000 | Baiatu | |
| 6,353,545 | B1 * | 3/2002 | Ueda | H02M 1/36 323/908 |
| 6,795,287 | B2 * | 9/2004 | Kim | H02P 9/105 310/149 |
| 7,113,380 | B2 * | 9/2006 | Youm | H02H 9/001 361/23 |
| 7,245,110 | B2 * | 7/2007 | Duff, Jr. | H01G 9/155 320/166 |
| 7,333,316 | B1 | 2/2008 | Norris | |
| 7,430,101 | B2 * | 9/2008 | Komulainen | H02M 5/458 361/111 |
| 7,518,838 | B1 | 4/2009 | Oldenburg et al. | |
| 7,573,253 | B2 * | 8/2009 | Lestican | H01F 27/343 323/356 |
| 7,778,045 | B2 * | 8/2010 | Alexander | H02M 3/1582 363/124 |
| 7,952,842 | B2 | 5/2011 | Engel | |
| 7,957,166 | B2 * | 6/2011 | Schnetzka | H02M 7/003 363/40 |
| 7,965,484 | B2 * | 6/2011 | Baudesson | H02M 5/458 361/90 |
| 8,004,803 | B2 | 8/2011 | Schnetzka | |
| 8,014,110 | B2 * | 9/2011 | Schnetzka | F25B 49/025 318/434 |
| 2001/0055186 | A1 | 12/2001 | Thomas Wodrich et al. | |
| 2007/0132531 | A1 | 6/2007 | Elms | |
| 2009/0301851 | A1 | 12/2009 | Morris et al. | |
| 2011/0210553 | A1 | 9/2011 | Engelhardt et al. | |
| 2012/0218672 | A1 * | 8/2012 | Nunes | H02M 1/32 361/91.1 |

FOREIGN PATENT DOCUMENTS

| | | |
|---|---|---|
| JP | 2001241732 | 9/2001 |
| WO | 2004042844 | 5/2004 |
| WO | 2008137276 | 11/2008 |
| WO | 2011026250 | 3/2011 |

* cited by examiner

VARIABLE FREQUENCY DRIVE OVERVOLTAGE PROTECTION

BACKGROUND

Variable frequency motor drives offer a number of potential advantages including opportunities for enhanced efficiency, control, and performance. Yet they also pose a number of design challenges including a need to protect power electronics circuitry and components from overvoltage conditions which can result in catastrophic failures. Various attempts have been made to address these concerns including providing line reactors, fuses and/or circuit breakers between a power supply and a drive front end, using metal oxide varistors, snubber circuits and/or oversized DC bus capacitors in the drive, and using transistor-based switches or active transistor based voltage clamping or circuitry. While these approaches provide some benefits they all suffer from limitations and shortcomings. These disadvantages can be of particular concern for high load drive applications such as compressor drives for heating, ventilation, air conditioning or refrigeration (HVACR) systems such as chiller systems. There remains a significant need for the unique and inventive variable frequency drive overvoltage protection, apparatuses, methods and systems disclosed herein.

DISCLOSURE

For the purposes clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall be understood that no limitation of the scope of the invention is thereby created, and that the invention includes and protects such alterations, modifications, and further applications of the exemplary embodiments as would occur to one skilled in the art to which the invention relates.

SUMMARY

Unique apparatuses, methods and systems of variable frequency drive overvoltage protection are disclosed. In an exemplary embodiment, a variable frequency motor drive system including a rectifier, a DC bus electrically coupled with the rectifier, an inverter electrically coupled with the DC bus is provided. A protection device electrically coupled with the rectifier and configured to interrupt power supply to the system based upon fault conditions is provided. A controller is provided and configured to receive information indicative of a voltage of the DC bus, process the received information to model a condition of at least one component of the variable frequency motor drive, and control the protection device to interrupt power supply to the variable frequency motor drive if the modeled condition meets a fault criterion. Further embodiments, forms, objects, features, advantages, aspects, and benefits shall become apparent from the following description and drawings.

DETAILED DESCRIPTION

Figure 1:
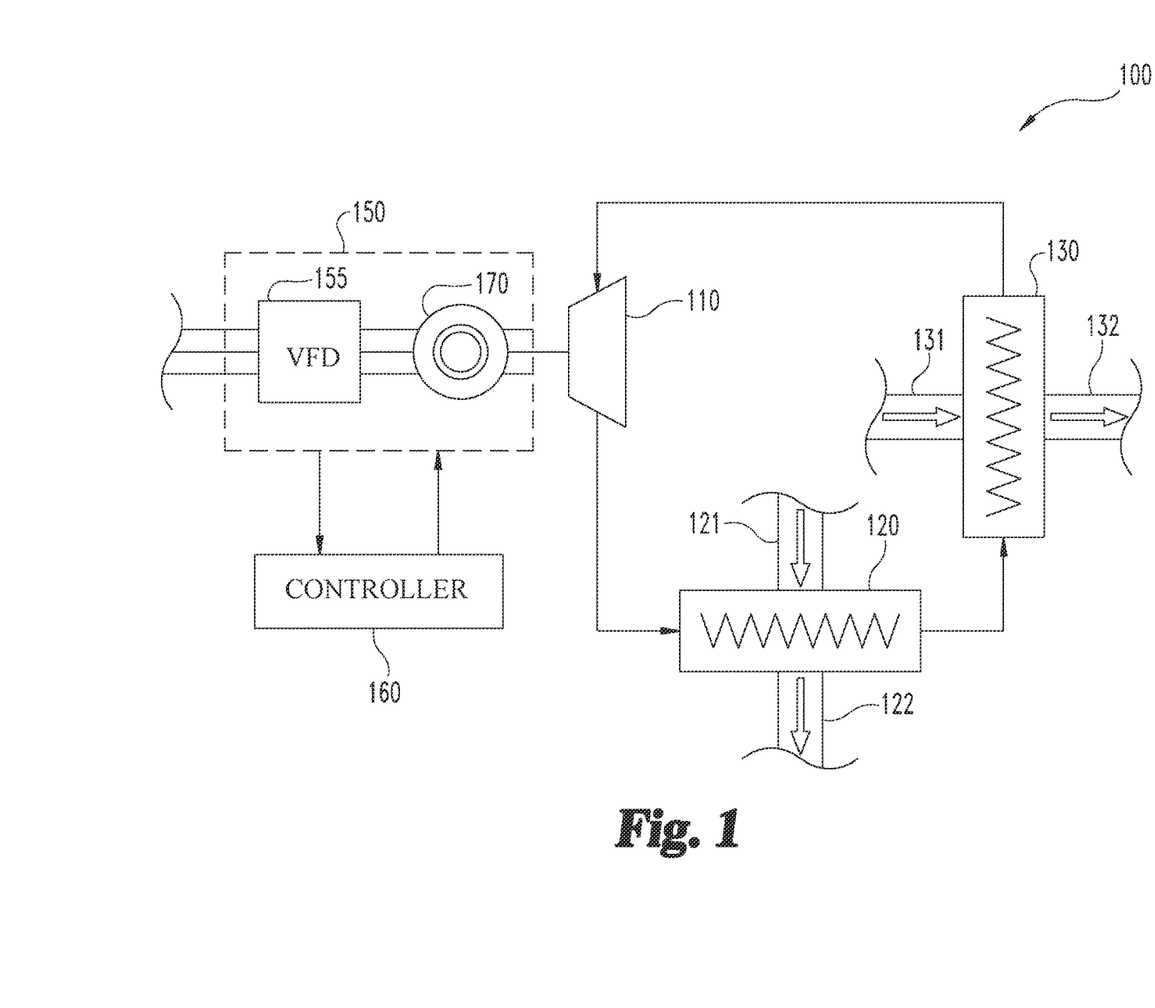
FIG. 1 is a schematic illustration of an exemplary HVACR system.

With reference to FIG. 1 there is illustrated an exemplary HVACR system 100 which includes a refrigerant loop comprising a compressor 110, a condenser 120, and an evaporator 130. Refrigerant flows through system 100 in a closed loop from compressor 110 to condenser 120 to evaporator 130 and back to compressor 110. Various embodiments may also include additional refrigerant loop elements including, for example, valves for controlling refrigerant flow, refrigerant filters, economizers, oil separators and/or cooling components and flow paths intermediate various system components.

Compressor 110 is driven by a drive unit 150 including a permanent magnet electric motor 170 which is driven by a variable frequency drive 155. In the illustrated embodiment, variable frequency drive 155 is configured to output a three-phase PWM drive signal, and motor 170 is a surface magnet permanent magnet motor. Use of other types and configurations of variable speed drives or variable frequency drives and other types of electric motors such as interior magnet permanent magnet motors and induction motors is also contemplated.

Condenser 120 is configured to transfer heat from compressed refrigerant received from compressor 110. In the illustrated embodiment condenser 120 is a water cooled condenser which receives cooling water at an inlet 121, transfers heat from the refrigerant to the cooling water, and outputs cooling water at an output 122. It is also contemplated that other types of condensers may be utilized, for example, air cooled condensers or evaporative condensers. It shall further be appreciated that references herein to water include water solutions comprising additional constituents unless otherwise limited.

Evaporator 130 is configured to receive refrigerant from condenser 120, expand the received refrigerant to decrease its temperature and transfer heat from a cooled medium to the refrigerant. In the illustrated embodiment evaporator 130 is configured as a water chiller which receives water provided to an inlet 131, transfers heat from the water to the refrigerant, and outputs chilled water at an outlet 132. It is contemplated that a number of particular types of evaporators and chiller systems may be utilized, including dry expansion evaporators, flooded type evaporators, bare tube evaporators, plate surface evaporators, and finned evaporators among others.

HVACR system 100 further includes a controller 160 which outputs control signals to variable frequency drive 155 to control operation of the motor 170 and compressor 110. Controller 160 also receives information about the operation of drive unit 150. In exemplary embodiments controller 160 receives information relating to motor current, motor terminal voltage, and/or other operational characteristics of the motor as well as DC bus voltage information as further described herein below. It shall be appreciated that the controls, control routines, and control modules described herein may be implemented using hardware, software, firmware and various combinations thereof and may utilize executable instructions stored in a non-transitory computer readable medium or multiple non-transitory computer readable media. It shall further be understood that controller 160 may be provided in various forms and may include a number of hardware and software modules and components.

Figure 2:
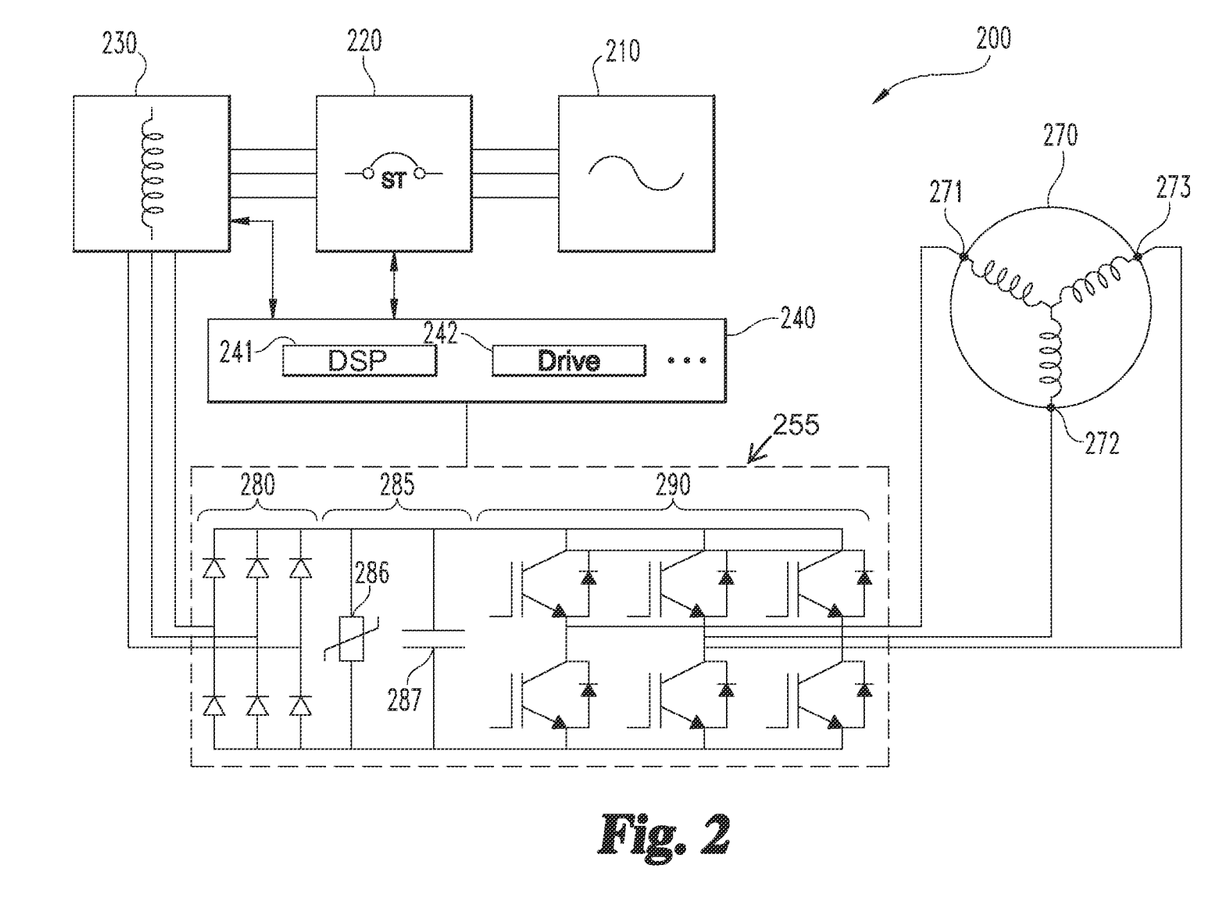
FIG. 2 is a schematic illustration of an exemplary variable frequency motor drive system.

With reference to FIG. 2 there is illustrated a circuit diagram for an exemplary variable speed electric motor drive system 200. System 200 is connected to a power source 210 such as a utility power supply or a backup generator which provides AC power to protection device 220. Protection device 220 may be a shunt trip circuit breaker, a contactor, or other type of device configured to electrically disconnect the power source 210 from down line components based upon a received control signal. Protection device 220 normally provides three phase electric power to line filter 230, but can be controlled to interrupt the power supply upon receipt of a command or control signal. Protection device 220 has the capability to disconnect supply voltage from the assembly within a specified time period when provided with a trip signal or command, preferably within one blind power cycle. The components comprising the variable speed drive assembly, including rectifiers, capacitors, MOVs, and the inverter, which are described in further detail below, are selected to sustain normal operation with normal supply voltage applied with a margin and the protection device 220 is controlled to limit operation to within the margin.

Line filter 230 includes a reactor configured to provide harmonic damping to mitigate losses which can arise from harmonic feedback from drive components to power source 210. Line filter 230 outputs three-phase AC power to a rectifier 290 which converts the AC power to DC power and provides the DC power to a DC link 285. In the illustrated embodiment, rectifier 290 is configured as a 6-pulse diode bridge, however, it shall be understood that 12-pulse, 18-pulse, 24-pulse or 30-pulse rectifiers may be utilized along with phase shifting transformers providing appropriate phase shifted inputs for 12-pulse, 18-pulse, 24-pulse, or 30-pulse operation, and that other types of rectifiers or AC/DC converters such as those including active components may be utilized.

The DC link 285 includes a metal oxide varistor (MOV) 286 and a capacitor 287. MOV 286 is configured to clamp DC bus voltage and provides protection against excessive transient voltages by shunting current created by the elevated voltage away from other system components up to a failure point. In other embodiments different components may be included in DC link 285 which also serve to limit voltage, for example, fast transient devices, semiconductor devices, diode-based clamps and other types of voltage clamps. Capacitor 287 is configured to smooth the output of the rectifier 280 and to mitigate harmonic feedback from inverter switching. In the illustrated embodiment, capacitor 287 is a film capacitor having relatively low capacitance as compared to electrolytic capacitors. Other embodiments may utilize capacitors having higher capacitance such as electrolytic capacitors. The output of the DC link 285 is coupled to the input of inverter 290.

Inverter 290 includes switches which are connected to the positive and negative lines of the DC link 285. In the illustrated embodiment the switches of inverter 290 are configured as IGBT and diode based switches, but other types of power electronics switching components such as power MOSFETs or other electrical switching devices may also be utilized. The inverter 290 is controlled to output a pulse width modulation (PWM) voltage signal to terminals 271, 272 and 273 of motor 270.

Motor 270 includes a stator, a rotor and a gap between the rotor and the stator. Motor terminals 271, 272 and 273 are connected to windings provided in stator 271. In exemplary embodiments the motor is a permanent magnet motor including a plurality of permanent magnets provided on the surface or the interior of the rotor.

System 200 further includes control circuitry 240 which includes a microprocessor-based digital signal processor (DSP) 241 and a gate drive module 242 as well as other components providing internal and external communication capabilities. DSP 241 is configured to receive control commands indicating desired system operation, process the received commands to provide switch control signals to drive module 240 which in turn outputs control signals to the switch elements of inverter 290. In the illustrated embodiment, the switch control signals are IGBT gate control voltages which are boosted to a final control voltage by intermediate boost units. It is contemplated however, that a variety of different configurations could be utilized depending upon the configuration of inverter 290.

DSP 241 receives information from a number of other components of system 200. In one aspect DSP 241 is configured to receive information indicating the voltage of DC bus 285. This received information may be utilized to provide control functionality for a variety of other components including protection device 220. In exemplary embodiments, DSP 241 is configured to implement a shunt trip function which triggers protection device 220 to provide an open circuit condition in order to avoid catastrophic system failures. In certain forms, protection device 220 is a shunt trip circuit breaker, however, it shall be understood that contactors, solid state switches or other devices configured to disconnect or open a circuit may be utilized. Thus, while certain embodiments are described with reference to a shunt trip circuit breaker, it shall be understood that this description also applies to other protection devices unless otherwise indicated.

Under transient or abnormal/full power supply conditions, voltages can be applied to system 200 in excess of normal values and typical supply tolerances. In exemplary cost/performance optimized systems, many of the components used cannot tolerate these excess voltages for the period of time that elapses to detect the voltage and trip the protective device due to an overcurrent condition. Successful operation and protection of these components may be accomplished through selection of component technologies, values and voltage ratings such that the assembly is tolerant of operating input voltage over the desired normal tolerance band and in concert with the limiting impedance tolerates atypical voltage excursions caused by faults/failures in the electrical supply up to a detected value, and for sufficient time, such that the protective device trips. The techniques disclosed herein can be implemented to provide proactive protection of the drive components by limiting operation to within their designed rated values and avoiding damaging overcurrent conditions altogether.

In certain embodiments a shunt trip function is implemented with DSP 241 and is preferably configured to energize a shunt trip relay of a circuit breaker provided intermediate a power supply and a variable frequency drive to prevent catastrophic failure of a the drive. In exemplary embodiments, the shunt trip function is designed to sense DC bus voltage and detect failure mechanisms and prevent failure when possible. The shunt trip function is preferably configured to interrupt power to the drive before the failure causes the circuit breaker to trip via its overcurrent protective function.

By way of example, analysis of an exemplary variable frequency drive system including the features described above in connection with FIG. 2 identified several criteria which an exemplary shunt trip function must account for, including MOV energy absorption curves, DC bus overvoltage, and practical limits of protection device response time and sensing circuitry. In the present example, the MOV was identified as the system component most sensitive to overvoltage failure and the MOV connection curves and energy absorption curves were utilized to determine failure criteria. It shall be appreciated, however, that in other embodiments different components or devices with different minimum conduction curves may be utilized as the basis for modeling failure modes. In some embodiments the minimum conduction curve may be a function of the characteristics of multiple components or devices collectively, for example, multiple MOVs in parallel or series, MOVs in parallel with other protective devices to extend its minimum conduction curve, or other combinations of protective devices.

DC bus overvoltage occurs on startup and is worst when bus MOV happens to follow the maximum conduction curve. Practical limits such as delay time of energizing the coil and the magnitude limit of bus voltage sensing circuits constrain the upper left voltage time boundary before a realizable protection function. Based on these considerations an exemplary shunt trip function may be defined as a sixth order differential voltage accumulator with respect to time, for example, as described by equation 1:

$$(VDC-STminV)^6 * t = (STmaxV-StminV)^6 * STtime \quad (1)$$

In equation 1 VDC is DC bus voltage, STminV is the minimum voltage which could theoretically trigger a shunt trip, STmaxV is a threshold above which a shunt trip should always be triggered, STtime is the time it takes to trigger a shunt trip when DC bus voltage is equal to STmaxV, and t is time. For simplicity the terms $(STmaxV-StminV)^6 * STtime$ may be considered to be a constant STK and a substitution may be made to provide a shunt trip function according to equation 2:

$$(VDC-STminV)^6 * t = STK \quad (2)$$

It shall be appreciated that shunt trip functions according to equation 1 or 2 may be provided in a variety of implementations.

In certain embodiments the behavior of the MOV may be modeled in greater detail by addition of a bleed down constant to the accumulator. By way of example, if a MOV has a maximum power dissipation of 2.5 W and a maximum energy absorption of 2325 J, and a conservative assumption is made that maximum power dissipation is a constant rate, the behavior of the MOV can be modeled based upon these parameters. If the MOV receives a relatively strong surge at 2325 J it will take 2325 J/2.5 W or 930 seconds to cool down. A shunt trip function that accounts for this behavior can be provided. At four time constants the function will decay to 0.67 percent of its original value so taking 930/4 gives a 232.5 second time constant. At 12 Khz, 2.325 seconds times 1200 sample/second is 2790000 samples. Thus adding a multiplier constant of 2790000/2790001 or 0.99999964 to the shunt trip function will allow it to bleed down at approximately the required time constant to simulate MOV bleed down.

Figure 3:
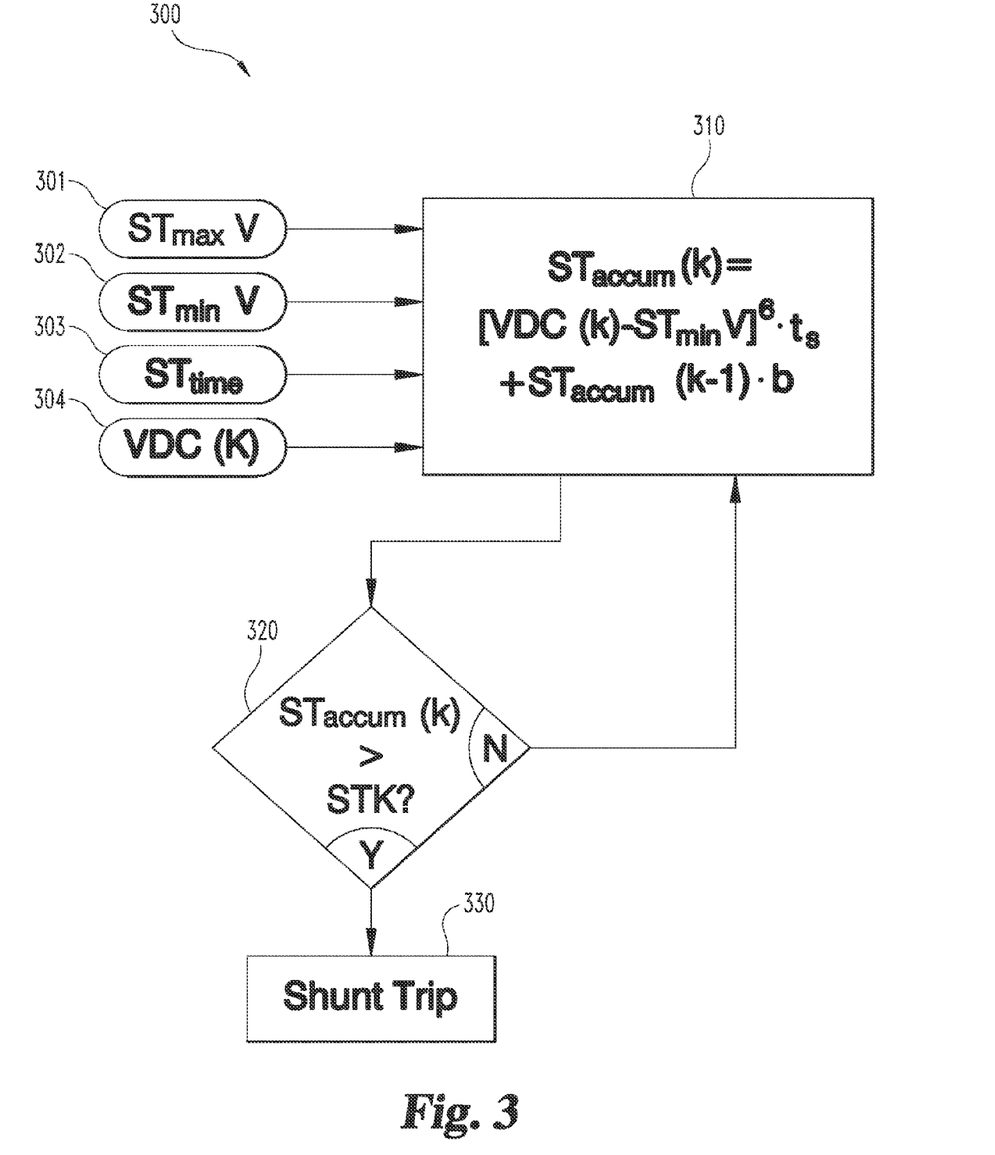
FIG. 3 is a flow diagram illustrating an exemplary diagnostic and control process.

With reference to FIG. 3 there is illustrated a flow diagram according to an exemplary shunt trip control process 300. Process 300 is an exemplary implementation of the techniques described above which models the physical system of one or more drive components and is configured to preemptively disconnect the variable frequency drive from the power source in the event of an impending failure. By acting this way a drive can be saved from catastrophic failure which may require entire drive replacement.

In process 300, operator 310 receives calibratibles STmaxV 301, STminV 302, and STtime 303 as inputs. Operator 310 also receives voltage sample VDC(k) 304. Calibratibles 301, 302 and 303 may be predetermined values stored in a computer readable memory of a controller which are accessed and utilized by executable routine implementing process 300. The values of calibratibles 301, 302 and 303 may be determined empirically and may vary depending upon the particular components utilized in the variable frequency drive and the size of the drive to which the process is applied.

Calibratible STmaxV 301 serves as a threshold. Any voltage greater than the value STmaxV may be used to activate a shunt trip. Additionally, calibratible STmaxV 301 sets the "knee" of the shunt trip curve in conjunction with the shunt trip time variable STtime 303, for example, as illustrated and described in connection with FIG. 4. Calibratible STminV 302 is the minimum voltage which could theoretically trigger a shunt trip. Because shunt trip is a power function it would take infinite time to reach this minimum as it is asymptotic however the variable is still advantageously utilized. Calibratible STtime 303 is the time it takes to trigger a shunt trip function when the voltage is equal to the shunt trip maximum voltage equal to or greater than the shunt trip maximum voltage STmaxV 301. Variable 304 VDC(k) is a sample DC bus voltage which may be sensed, measured or determined using voltage sensing circuitry.

Operator 310 processes the inputs which it receives to determine an accumulated shunt trip value in accordance with Equation 3:

$$STaccum(k) = (VDC(k)-STminV)^6 * Ts + STaccum(k-1) \quad (3)$$

where k is a sample number, STaccum is the accumulated shunt trip value at a given sample number, VDC is a voltage of the DC link at a given sample number, MINV is the minimum voltage at which a power supply interruption should occur, and Ts is time. Further embodiments may determine an accumulated shunt trip value utilizing the terms above in combination with a bleed constant Kb in accordance with Equation 4:

$$STaccum(k) = (VDC(k)-STminV)^6 * Ts + STaccum(k-1) * Kb \quad (4)$$

From operation 310 process 300 proceeds to operator 320. Operator 320 determines whether the accumulated shunt trip value STaccum(k) is greater than shunt trip constant STK. If STaccum(k) is not greater than STK, process 300 returns to operation 310. If STaccum(k) is greater than STK, process 300 proceeds to operation 330 which activates a shunt trip by sending a shunt trip command. It shall be appreciated that the shunt trip command may be utilized in conjunction with a variety of devices including but not limited to a shunt trip circuit breaker, a contactor, a solid state switch or other device that can provide an open circuit in response to a signal or command.

Figure 4:
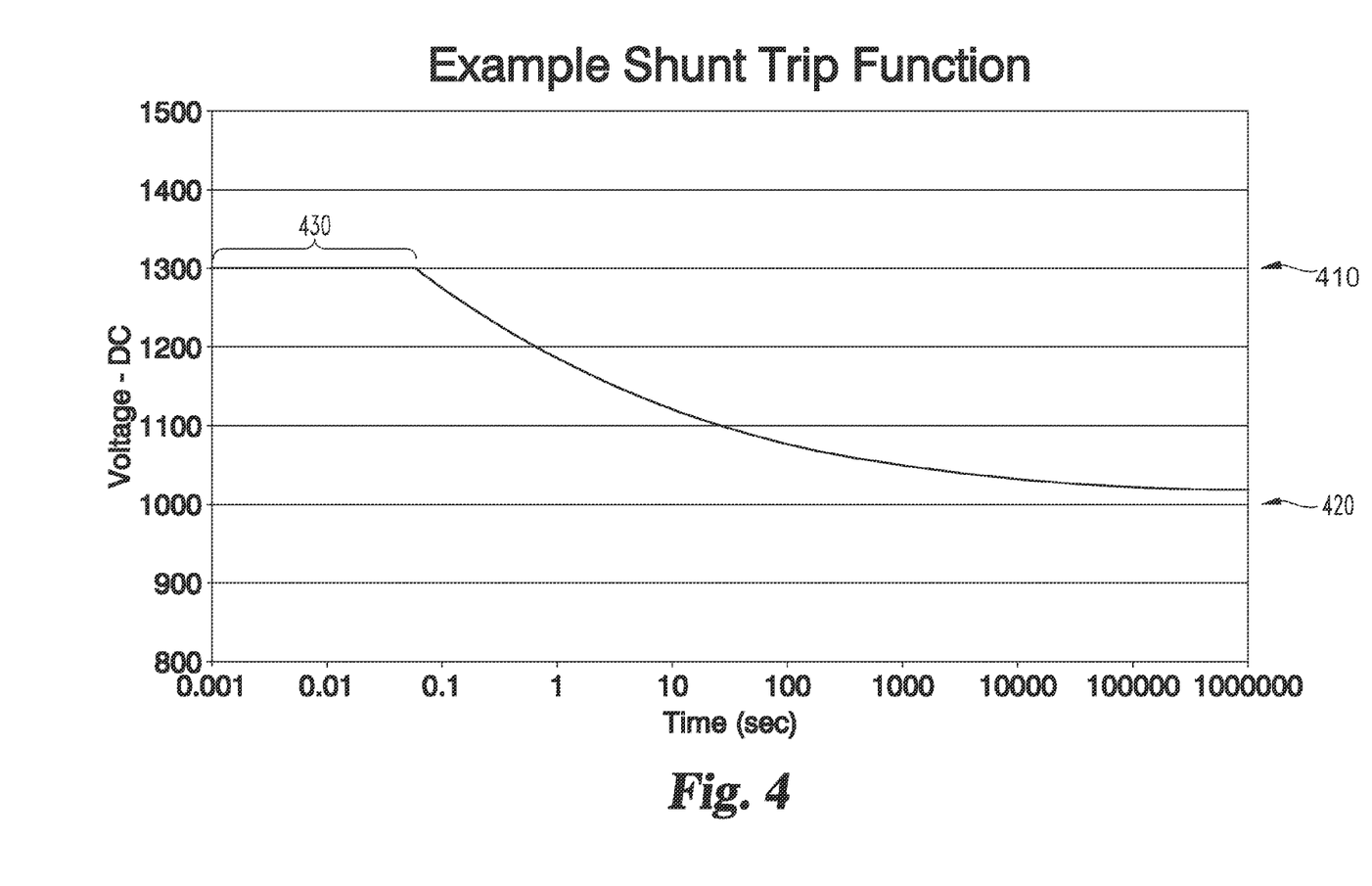
FIG. 4 is a graph illustrating characteristics of an exemplary shunt trip function.

With reference to FIG. 4 there is illustrated a graph of DC bus voltage on the vertical axis versus the logarithmic time on the horizontal axis in units of seconds. The graph of FIG. 4 illustrates characteristics of an exemplary shunt trip function. Voltage 410 is defined as the shunt trip maximum voltage. Voltage 420 is defined as the shunt trip minimum voltage. And the shunt trip time extends over duration 430.

Figure 5:
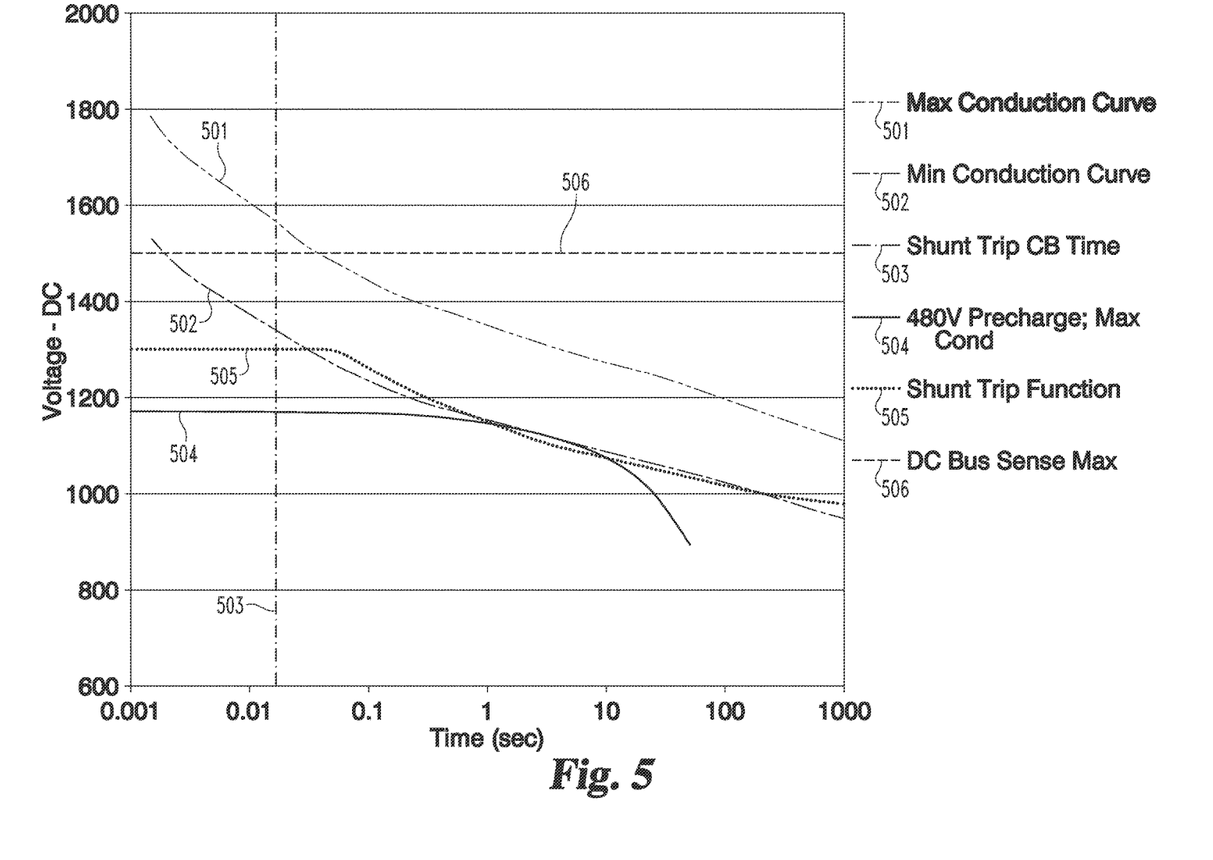
FIG. 5 is a graph illustrating characteristics of an exemplary shunt trip function in combination with additional drive characteristic curves.

With reference to FIG. 5, there is illustrated a graph of DC voltage versus logarithmic time in units of seconds. FIG. 5 illustrates a maximum conduction curve 501 and a minimum conduction curve 502 which define the maximum and minimum time-voltage curves for MOV failure. MOV's have some statistical variation for these time-voltage conduction curves. Maximum conduction curve 501 represents the upper statistical limit above which all MOVs in a statistical sample group will fail under steady state conditions. Minimum conduction curve 502 represents the lower statistical limit below which no MOV in the sample group will fail at steady state conditions. The region between curves 501 and 502 contains all the failure points for MOVs in the sample set. Depending on the level or reliability desired, a shunt trip function may seek to approximate, follow or maintain some margin relative to any curve between and including curves 501 and 502. In certain exemplary implementations, a shunt trip function will seek to follow curve 502. Shunt trip function 505 is illustrated as one example of such a function which generally seeks to track curve 502, but which permits some deviation therefrom as a tradeoff to minimize computational complexity. It shall be appreciated that other shunt trip function curves could also be utilized which follow different paths than the illustrated example.

FIG. 5 further illustrates a shunt trip circuit breaker time 503 which represents the minimum response time of a circuit breaker or contactor and DC bus max sense voltage 506 which represents the maximum DC bus sense input level. Time 503 and voltage 506 effectively define the region within which a shunt trip function can be expected to operate since they define the limits on operation of system components. These parameters are useful in setting the value of a shunt trip function to provide a margin accounting for delay in circuit breaker response time. For example, shunt trip function 505 is a constant value up to time 503 rather than attempting to track curve 502. This provides some margin to accommodate system component delay. FIG. 5 also illustrates a 480V precharge max conduction curve 504 which represents the theoretical worst case for startup transient. Curve 504 represents a worst case scenario for startup transient conditions. Curve 504 is useful in defining a nuisance trip boundary. A shunt trip function that follows a path above curve 504 will avoid unnecessary nuisance trips at startup events.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a variable frequency motor drive including an AC/DC converter electrically coupled with an AC power source, a DC link electrically coupled with the AC/DC converter, and a DC/AC converter electrically coupled with the DC link;
   receiving information indicative of a voltage of the DC link at a microprocessor-based controller;
   processing the received information to model a condition of at least one power electronics component of the variable frequency motor drive; and
   disconnecting the AC/DC converter from the AC power source if the modeled condition meets a protection criterion;
   wherein the disconnecting comprises performing a shunt trip operation performed in response to an evaluation of a DC bus voltage relative to a threshold, the shunt trip operation occurring without occurrence of an overcurrent condition.

2. A method according to claim 1 wherein the at least one power electronics device comprises a varistor electrically coupled to positive and negative rails of the DC link.

3. A method according to claim 2 wherein the processing models thermal capacity and power dissipation of the varistor.

4. A method according to claim 1 wherein the processing utilizes a function including a sixth order voltage differential.

5. A method according to claim 4 wherein the processing comprises calculating an accumulated value according to the equation $$ACCUM(k)=(VDC(k)-MINV)^6*Ts + ACCUM(k-1)$$

wherein k is a sample number, ACCUM is the accumulated value at a given sample number, VDC is a voltage of the DC link at a given sample number, MINV is the minimum voltage at which a power supply interruption should occur, and Ts is sample time.

6. A method according to claim 5 wherein the protection criterion comprises determining whether the value of ACCUM is greater than a predetermined value.

7. A method according to claim 1 wherein the disconnecting comprises providing a control signal to a shunt trip circuit breaker electrically coupled intermediate the AC power source and the AC/DC converter.

8. A method according to claim 7 wherein the rectifier comprises a 6-pulse diode bridge and the inverter comprises three phase IGBT-based switching circuitry.

9. A method according to claim 1 wherein the AC/DC converter comprises a rectifier and the DC/AC converter comprises an inverter.

10. A method according to claim 4 wherein the processing comprises calculating an accumulated value according to the equation:

$$ACCUM(k)=(VDC(k)-MINV)^6*Ts+ACCUM(k-1)*Kb$$

wherein k is a sample number, ACCUM is the accumulated value at a given sample number, VDC is a voltage of the DC link at a given sample number, MINV is the minimum voltage at which a power supply interruption should occur, Ts is sample time, and Kb is a bleed down constant.

11. A system comprising:
a variable frequency motor drive including a rectifier, a DC bus electrically coupled with the rectifier, and an inverter electrically coupled with the DC bus;
a protection device electrically coupled with the rectifier and configured to interrupt power supply to the variable frequency motor drive based upon a received triggering signal;
a controller configured to receive information indicative of a voltage of the DC bus, process the received information to model a condition of at least one component of the variable frequency motor drive, and provide a triggering signal to the protection device to interrupt power supply to the variable frequency motor drive if the modeled condition meets a fault criterion, the triggering signal being effective to interrupt power to the drive in response to an evaluation of a DC bus voltage relative to a limit and without regard to presence or absence of an overcurrent condition.

12. A system according to claim 11 wherein the at least one component comprises a metal oxide varistor.

13. A system according to claim 11 wherein the controller is configured to determine a sixth order differential voltage and to utilize the determined differential in connection with control of the protection device.

14. A system according to claim 11 wherein the controller configured to determine an accumulated value according to the equation $$ACCUM(k)=(VDC(k)-MINV)^{6}*Ts +ACCUM(k-1)$$

wherein k is a sample number, ACCUM is the accumulated value at a given sample number, VDC is a voltage of the DC link at a given sample number, MINV is the minimum voltage at which a power supply interruption should occur, and Ts is sample time.

15. A system according to claim 14 wherein the controller is configured to determine whether the value of ACCUM is greater than a fault threshold value, and provide the triggering signal to the protection device based upon the fault threshold value being met or exceeded.

16. A system according to claim 11 wherein the controller is configured to determine an accumulated value according to the equation:

$$ACCUM(k)=(VDC(k)-MINV)^{6}* Ts+ ACCUM(k-1)*K$$

wherein k is a sample number, ACCUM is the accumulated value at a given sample number, VDC is a voltage of the DC link at a given sample number, MINV is the minimum voltage at which a power supply interruption should occur, Ts is time, and K is a constant.

17. An apparatus comprising:
a non-transitory computer readable medium configured with instructions executable by a computer to:
determine a model state of at least one component of a variable frequency drive system including an AC/DC converter, a protection device electrically coupled between the AC/DC converter and the AC power source, and a DC link electrically coupled with the AC/DC converter based upon sampled DC link voltage information; and
control the protection device to perform a shunt trip in response to a DC bus voltage condition and irrespective of an overcurrent condition, the shunt trip operation being effective to disconnect the AC/DC converter from the AC power source and to disconnect the motor from the AC input based upon the determined model state.

18. An apparatus according to claim 17 wherein the model state is an accumulated differential voltage value and the at least one component comprises a varistor.

19. An apparatus according to claim 17 wherein the model state is an accumulated value determined in according to the equation:

$$ACCUM(k)=(VDC(k)-MINV)^{6*}Ts +ACCUM(K-1)$$

wherein k is a sample number, ACCUM is an accumulated value at a given sample number, VDC is a voltage of the DC link at a given sample number, MINV is the minimum voltage at which a power supply interruption should occur, and Ts is time.

20. An apparatus according to claim 19 wherein the accumulated value is compared to a threshold and the comparison is utilized to control the protection device.

21. An apparatus according to claim 17 wherein the model state is a sixth-order accumulated differential voltage value.

22. An apparatus according to claim 21 wherein the model state is determined according to the equation:

$$ACCUM(k)=(VDC(k)-MINV)^{6*}Ts + ACCUM(k-1)*Kb$$

wherein k is a sample number, ACCUM is an accumulated value at a given sample number, VDC is a voltage of the DC link at a given sample number, MINV is the minimum voltage at which a power supply interruption should occur, Ts is time, and Kb is a constant accounting for characteristics of a varistor.

* * * * *